US010137377B1

(12) United States Patent
Vance et al.

(10) Patent No.: US 10,137,377 B1
(45) Date of Patent: Nov. 27, 2018

(54) VARIABLE VEHICLE RIDE SWITCH

(71) Applicant: Universal City Studios LLC, Universal City, CA (US)

(72) Inventors: Eric A. Vance, Orlando, FL (US); Michael Habersetzer, Windermere, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/606,833

(22) Filed: May 26, 2017

(51) Int. Cl.
| A63G 1/48 | (2006.01) |
| B65G 47/48 | (2006.01) |
| A63G 1/12 | (2006.01) |
| A63G 1/24 | (2006.01) |
| A63G 31/00 | (2006.01) |
| A63G 9/16 | (2006.01) |

(52) U.S. Cl.
CPC .......... *A63G 1/48* (2013.01); *A63G 1/12* (2013.01); *A63G 1/24* (2013.01); *B65G 47/487* (2013.01); *A63G 9/16* (2013.01); *A63G 31/007* (2013.01)

(58) Field of Classification Search
CPC ...... A63G 31/00; A63G 31/007; A63G 31/16; A63G 21/00; A63G 21/16
USPC ........ 472/43, 44, 59, 117, 128, 129; 104/55, 104/69, 70
See application file for complete search history.

(56) References Cited

U.S. PATENT DOCUMENTS

| 536,441 A | 3/1895 | Morris |
| 4,037,738 A | 7/1977 | Johnson |
| 6,006,672 A | 12/1999 | Newfarmer et al. |
| 6,502,688 B1 | 1/2003 | Krooss et al. |
| 7,093,705 B2 | 8/2006 | Ohiro et al. |
| 8,038,541 B1 | 10/2011 | Solomon |
| 8,578,857 B2 | 11/2013 | Crawford et al. |
| 8,795,095 B2 * | 8/2014 | Stoker .................... A63G 31/16 472/43 |
| 8,905,852 B2 * | 12/2014 | Geylik ................... A63G 31/16 472/43 |
| 2002/0142851 A1 * | 10/2002 | Hunter ................... A63G 21/18 472/117 |
| 2005/0092580 A1 | 5/2005 | Clemens |
| 2013/0045811 A1 | 2/2013 | Stoker |
| 2013/0145953 A1 | 6/2013 | Crawford et al. |

FOREIGN PATENT DOCUMENTS

| DE | 20316695 U1 | 3/2005 |
| JP | H07108090 | 4/1995 |
| JP | 3073297 B2 | 8/2000 |
| WO | 0034100 | 6/2000 |

OTHER PUBLICATIONS

PCT/US2018/034204 Invitation to Pay Fees dated Sep. 12, 2018.

* cited by examiner

*Primary Examiner* — Kien Nguyen
(74) *Attorney, Agent, or Firm* — Fletcher Yoder, P.C.

(57) ABSTRACT

A variable vehicle ride switch in accordance with present embodiments includes a base configured to rotate with respect to a ride surface. The variable vehicle ride switch also includes a conveyor positioned on the base that can actuate relative to the base to move a ride vehicle towards or away from an outer edge of the base and to change an angle or orientation of the at least one conveyor within the base, e.g., to rotate within the base. The variable vehicle ride switch also includes a controller configured to receive an activation signal to cause the base to rotate and to actuate the conveyor.

32 Claims, 9 Drawing Sheets

VARIABLE VEHICLE RIDE SWITCH

The present disclosure relates generally to the field of amusement parks. More specifically, embodiments of the present disclosure relate to methods and equipment utilized to provide amusement park experiences.

BACKGROUND

Various forms of amusement rides have been used for many years in amusement or theme parks. These include traditional rides such as roller coasters, track rides, and water vehicle-based rides. Certain types of rides have a closed loop track path, with side pathways implemented off of the main track for vehicle maintenance and storage. Switches for directing a ride vehicle along a different section of the track are integrated to the fixed track. Such switches may be implemented via a switch coupled to track rides, which separates a track section at both ends. However, switches change the direction of a ride vehicle at a fixed angle of rotation from the original direction of travel such that the track loop or pathway is complete at either end of the rotation. That is, the vehicle options are to continue on the closed pathway or to exit the closed pathway at a fixed angle after the switch has rotated to couple the vehicle to a single different track section. However, switches can be bottlenecks to progression through a ride that contains multiple, spaced-apart vehicles and are typically not configured for dynamic adjustment of a vehicle pathway or direction during a ride. Further, not all rides are track-based and, accordingly, such trackless rides are not implemented with track switches for changing vehicle direction. Accordingly, there is a need to provide vehicle direction adjustment for an amusement ride vehicle that can be incorporated into a vehicle pathway during the course of an amusement ride.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a vehicle ride is provided that includes a variable vehicle ride switch. The variable vehicle ride switch includes a base configured to rotate with respect to a ride surface; a base controller configured to receive an activation signal to cause the base to rotate; and at least one conveyor positioned on the base and configured to rotate together with the base and configured to actuate relative to the base to move a ride vehicle onto or off of the base. The vehicle ride also includes a plurality of vehicle pathways, wherein the variable vehicle ride switch is positioned at a junction of the plurality of vehicle pathways; and a ride controller programmed with instructions to provide the activation signal to the base controller to cause the base to rotate to at least partially align the at least one conveyor with a vehicle pathway of the plurality of vehicle pathways.

In accordance with another embodiment, a method is provided that includes the steps of receiving a first ride vehicle on a variable vehicle ride switch; receiving a second ride vehicle on the variable vehicle ride switch; rotating a base of the variable vehicle ride switch to a first exit position while the first ride vehicle is on the variable vehicle ride switch; conveying the first ride vehicle off of the variable vehicle ride switch at the first exit position of the base; rotating the base of the variable vehicle ride switch to a second exit position of the base while the second ride vehicle is on the variable vehicle ride switch; and conveying the second ride vehicle off of the variable vehicle ride switch at the second exit position, wherein the second exit position is different from the first exit position.

In accordance with another embodiment, a variable vehicle ride switch is provided that includes a base configured to rotate with respect to a ride surface; at least one conveyor positioned on the base and configured to actuate relative to the base to move a ride vehicle towards or away from an outer edge of the base and to change an angle or orientation of the at least one conveyor within the base; and a controller configured to receive an activation signal to cause the base to rotate and to cause the at least one conveyor to actuate.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure provides variable vehicle ride switches that may be used in conjunction with amusement park rides to provide adjustment to vehicle direction, orientation, and/or path. Because rides have certain fixed structures that are not easily modified, providing variability within an amusement park ride for repeat riders can extend the enjoyment and lifespan of the ride, which in turn provides cost savings associated with upgrades or replacement of the ride.

The disclosed variable vehicle ride switches provide benefits over existing fixed-rotation or fixed-pathway switches. In one embodiment, the disclosed variable vehicle ride switches are capable of receiving a vehicle from any one of multiple available input paths and are capable of ejecting the vehicle into any one of the multiple available output paths (which may be the same or different than the input paths, depending on the desired ride configuration). Additionally or alternatively, as disclosed herein, the variable vehicle ride switches are capable of reversing an orientation of travel for a ride vehicle, e.g., forward-facing to backward-facing or vice versa. Alternatively or additionally, the variable vehicle ride switches are capable of dynamically sending a vehicle along a path, such as in a trackless vehicle ride, and at an exit angle from the switch that may be defined by a controller to facilitate certain effects or to propel the vehicle in a desired direction. In one example, the variable vehicle ride switches are capable of reversing a vehicle orientation and sending the reversed vehicle onto a pathway that is among a selection of available pathways for the vehicle. In another example, the next vehicle may be sent onto another pathway in the same orientation without orientation reversal. In this manner, the variable vehicle ride switches facilitate flexibility in various possible ride pathways and orientations for ride vehicles, thus introducing more excitement into the ride. In addition, the variable vehicle ride switches are capable of matching the speed of or accelerating a vehicle moving across the switch, thus reducing bottlenecks. Further, in certain implementations, the variable vehicle ride switches may be configured to accommodate multiple vehicles simultaneously to facilitate increased throughput. Yet further, in certain embodiments, the variable vehicle ride switches permit enhanced direction and orientation variability for ride vehicles without implementing steering or motor functionality on the ride vehicle itself.

Figure 1:
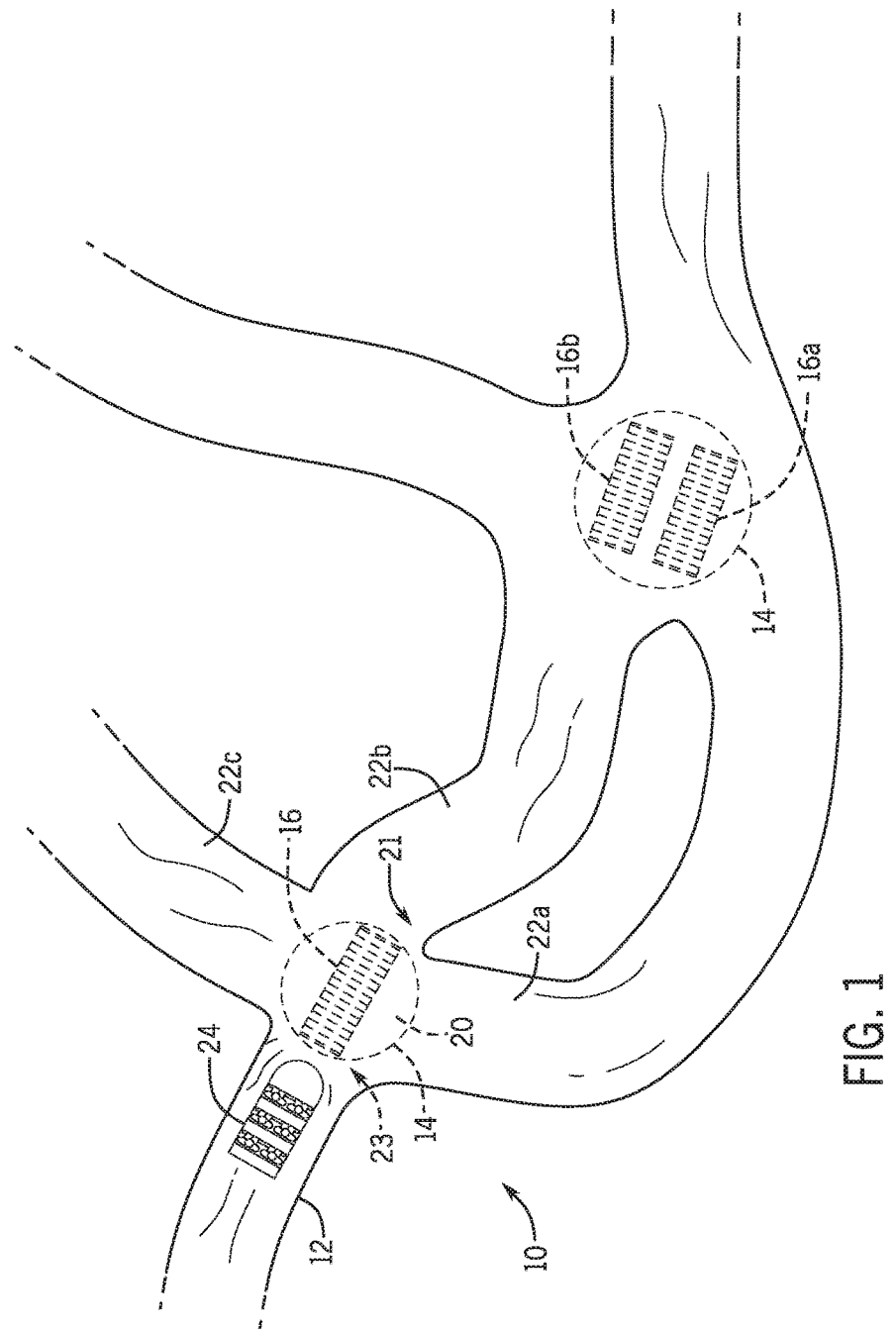
FIG. 1 is a perspective view of a water park attraction including a variable vehicle ride switch in accordance with present techniques.

FIG. 1 is a schematic overview of a ride system 10 implemented as a water ride, e.g., having a ride pathway defined by a flume 12 and, for example, having a directional flow of water. The ride system includes one or more variable vehicle ride switches 14. In certain embodiments, the variable vehicle ride switch 14 includes a conveyor 16 positioned in or on a base 20. The base 20 may be implemented as a turntable that rotates (e.g., under motor power) relative to a ride surface, e.g., a fixed ride floor surface 21. While the disclosed embodiments illustrate the base 20 as a generally annular platform, it should be understood that other configurations are contemplated. For example, the base 20 may assume different shapes or sizes. Further, the base 20 may be implemented as a solid platform or, in certain embodiments, as an open frame that permits water to flow in and around the base 20, which may help maintain water current patterns in the ride system 10.

In one embodiment, the base 20 of the variable vehicle ride switch 14 is substantially flush with or disposed on the ride floor surface 21. In other embodiments, the variable vehicle ride switch 14 is raised relative to the ride floor surface 21. The conveyor 16, being positioned on or in the base 20, rotates along with the base 20 when the base 20 rotates. In certain embodiments, the base 20 is configured to rotate in a range between 5-360 degrees, 270 degrees or less, 180 degrees or less, or 90 degrees or less from an initial starting position and in either direction and based on activation signals. In specific embodiments, the base 20 may rotate 15-30 degrees, 30-90 degrees, 90-180 degrees, 180-270 degrees in either direction. Further, the rotation of the base 20 may be processor controlled and set to a desired rotation and direction depending on the ride configuration. In addition, the conveyor 16 is configured to actuate within the base 20 and relative to the base 20. In one embodiment, the conveyor 16 has at least one degree of freedom relative to the base 20, as provided herein.

The variable vehicle ride switch 14 is positioned within the ride system 10 at an intersection or junction 23 of multiple pathways 22 (shown as pathways 22a, 22b, 22c). The variable vehicle ride switch 14 permits alignment of the conveyor 16 with a desired pathway 22 among multiple pathways 22 in a variable manner, which in turn permits the ride system 10 to be dynamically reconfigured and provides increased enjoyment for passengers. Passengers in a ride vehicle 24 (e.g., a boat or a log) travel through the flume 12 and, at the junction 23, the ride vehicle 24 moves into position onto the variable vehicle ride switch 14. The ride system 10 may include multiple variable vehicle ride switches 14, including multi-vehicle variable vehicle ride switches 14 that include multiple conveyors 16a, 16b. The conveyor 16 may be implemented, for example, as a belt, roller, or track. In one embodiment, the conveyor 16 may include an arm or hook that couples to an underside of the ride vehicle 24 and moves laterally relative to the base 20 to convey the ride vehicle 24 across the base 20.

The variable vehicle ride switch 14, when the ride vehicle 24 is in position, switches to the desired pathway 22 by rotating the base 20 and actuating the conveyor 16. In particular embodiments, when the variable vehicle ride switch 14 is already positioned to permit the ride vehicle 24 to pursue the desired pathway (e.g., pathway 22b), the base 20 may remain stationary while the conveyor 16 actuates in a linear fashion to move the ride vehicle 24 across the variable vehicle ride switch 14 and onto the desired pathway 22. When a subsequent ride vehicle 24 is positioned on the variable vehicle ride switch 14, the desired pathway 22 may be different (e.g., pathway 22a), according to the ride configuration, and the ride system 10 may control the variable vehicle ride switch 14 accordingly to actuate to align the conveyor 16 with the desired pathway 22. In this manner, the ride system 10 may be dynamically reconfigured on a vehicle-by-vehicle basis during a single ride experience such that different ride vehicles 24 are oriented onto different pathways 22 relative to one another and, therefore, experience different ride events.

As provided herein, the ride system 10 may be implemented in a trackless manner. Accordingly, the alignment may be within an alignment range that varies according to ride conditions. For example, aligning the conveyor 16 with the desired pathway 22 may include aligning a direction of linear motion of the conveyor 16 in the forwards or backwards direction such that the ride vehicle 24 positioned on the conveyor 16, when actuated in a linear fashion off of the variable vehicle ride switch 14, will generally be oriented to travel along the desired pathway 22. In certain embodiments, the alignment may be partial alignment that may permit the ride vehicle 24 to enter the desired pathway 22 within a range of potential orientations that permit the ride vehicle 24 to travel and be carried by, for example, water current within the confines of the flume 12. Further, as provided herein, the alignment may be in a forward or reverse orientation for the ride vehicle 24.

Figure 2:
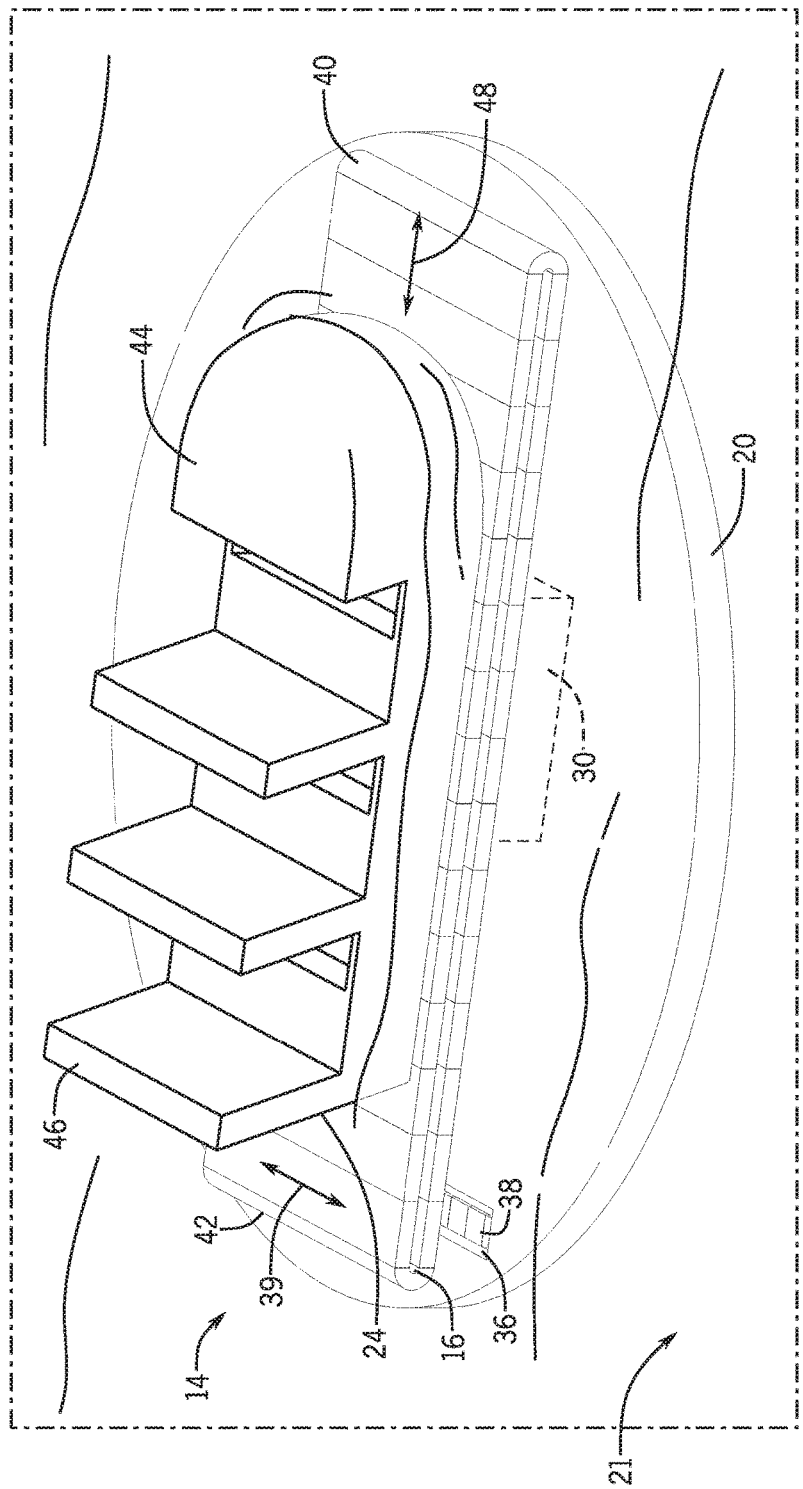
FIG. 2 is a perspective view of an embodiment of a ride vehicle positioned on a variable vehicle ride switch in accordance with present techniques.

FIG. 2 is a perspective view of the ride vehicle 24 posited on the variable vehicle ride switch 14. The base 20 may be configured as a platform or frame that supports the ride vehicle 24. In certain embodiments, the base 20 is positioned at a depth that approximately corresponds with an estimated depth of the ride vehicle 24 such that a bottom surface of the ride vehicle contacts the conveyor 16. Actuation of the variable vehicle ride switch 14 causes the ride vehicle to also move, e.g., to rotate when the base 20 is rotated and to move linearly according to linear movement of the conveyor 16. Generally, the conveyor 16 may be arranged in shape and size to accommodate the ride vehicle 24 and such that the movement of the conveyor 16 provides sufficient motive force to move the ride vehicle 24 on and off the variable vehicle ride switch 14. Further, in certain configurations, the base 20 may also be configured to tilt relative to the ride floor surface 21 to produce rolling or pitching motions to provide additional thrill experiences. The variable vehicle ride switch 14 may be at least partially or completely submerged so that passengers in the ride vehicle 24 cannot see the motion of the variable vehicle ride switch 14.

The variable vehicle ride switch 14 includes a rotator assembly 30 that drives rotation of the base 20 and, in certain embodiments, drives movement of the conveyor 16, e.g., via one or more motors or electric/pneumatic actuators. In certain embodiments, the variable vehicle ride switch may include an actuator assembly 36 that drives actuation of the conveyor 16 relative to the base 20, e.g., via one or more motors. In one embodiment, the actuator assembly 36 may include a track 38 defining the degree of rotation of the conveyor 16 within or relative to the base 20. In certain embodiments, the actuator assembly permits a narrower degree of rotation, shown by arrows 39, relative to the base. For example, the base 20 may be configured for 360 degree rotation while the conveyor is configured for rotation 45 degrees to the left or right. In this manner, granular changes in the orientation of the ride vehicle may be generated by the combined rotation of the base 20 and the conveyor 16, with the base 20 providing larger changes in orientation and the conveyor 16 proving finer changes or adjustments to the orientation. The actuator assembly 36 may be positioned relatively closer to one edge of the conveyor 16 (e.g., a front edge 40 or a back edge 42), and an opposing end of the conveyor may be coupled to a pin (not shown) or other feature to permit the conveyor 16 to rotate within the base 20 and move along the track 38. While the actuation assembly 36 is illustrated as including a track 38, it should be understood that other configurations are contemplated that facilitate the rotation of the conveyor 16. In other embodiments, the actuator assembly 36 may be implemented together with the rotator assembly to drive rotation or actuation of the conveyor from a relatively central position of the conveyor 16 (e.g., a midpoint along a direction of linear motion).

The actuator assembly may include a motor that drives the linear movement of the conveyor 16 in a forward direction towards the front edge 40 or a backward direction towards the back edge 42, shown by arrows 48 and relative to a vehicle front 44 and vehicle back 46, and that moves the ride vehicle 24 on or off the variable vehicle ride switch 14. The conveyor speed/direction may be selected to act as a brake for an onboarding ride vehicle 24. For example, the conveyor 16 may act as a brake to position the ride vehicle 24 in a relatively static position on the variable vehicle ride switch 14 as the base 20 and/or the conveyor 16 rotates. The conveyor 16 may move in the direction of the back edge 42 to counteract the force of the water current and to hold a relatively static position of the ride vehicle 24. The variable vehicle ride switch 14 may also include actuatable barriers or grips that deploy to hold the ride vehicle on the variable vehicle ride switch 14 during actuation and that are released at the completion of the actuation. In other embodiments, the conveyor 16 may operate to accelerate or maintain a speed of the incoming ride vehicle 24.

Figure 3:
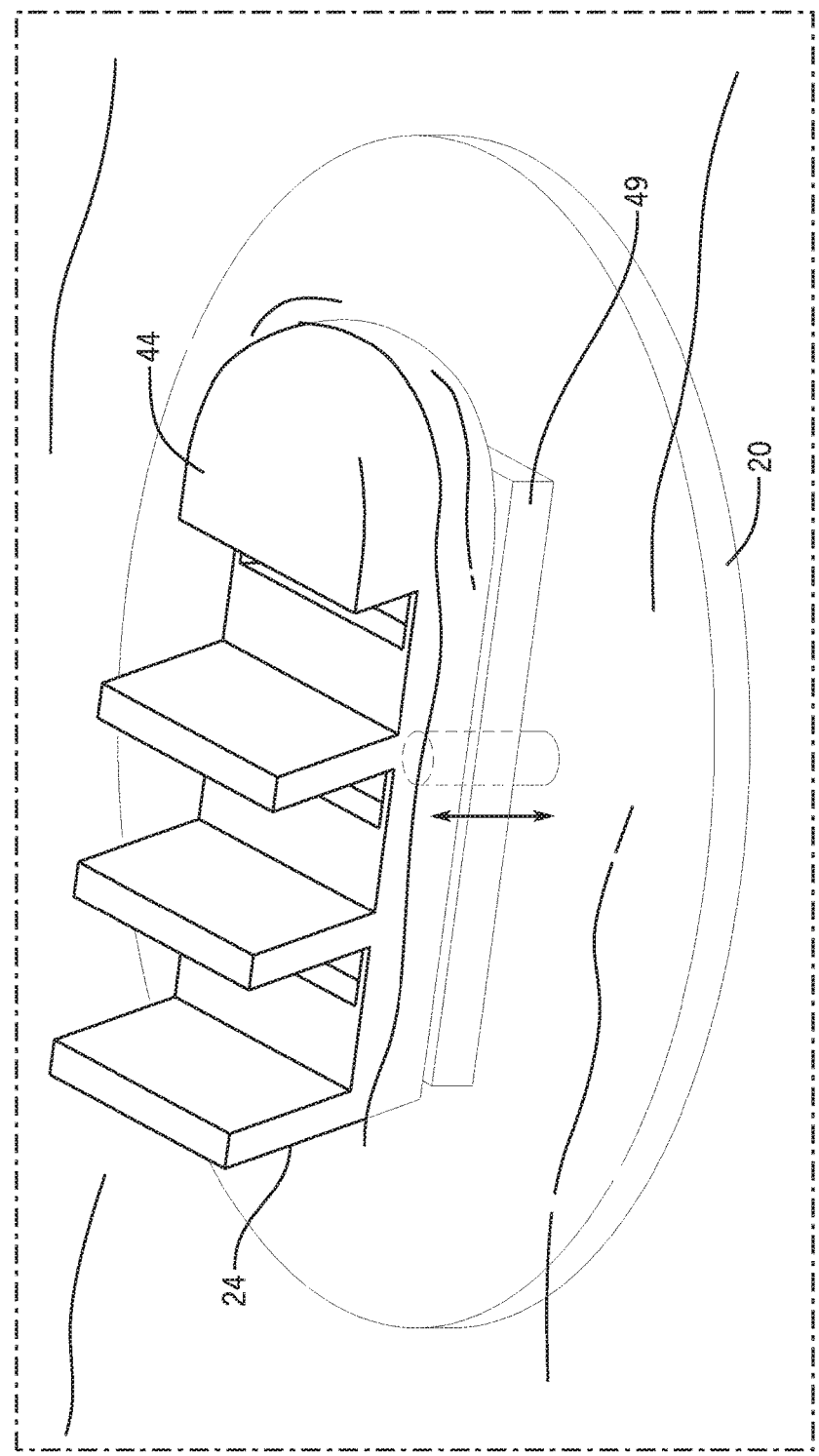
FIG. 3 is a perspective view of an embodiment of a ride vehicle positioned on a variable vehicle ride switch platen in accordance with present techniques.

In another embodiment, as illustrated in FIG. 3, the variable vehicle ride switch 14 is implemented to include a platen 49 that rises and lowers under the vehicle 24 to push on a bottom of a hull of the vehicle 24 with enough force to raise the vehicle changing its buoyancy causing it to rest in a stable manner. The platen 49 provides enough normal force and friction to stop the vehicle's forward motion in the constant flow of water. Releasing the vehicle 24 is accomplished by lowering the platen 49 to the point where buoyancy is restored and friction is reduced, and the movement of the water carries the vehicle 24 away from the base 20.

Figure 4:
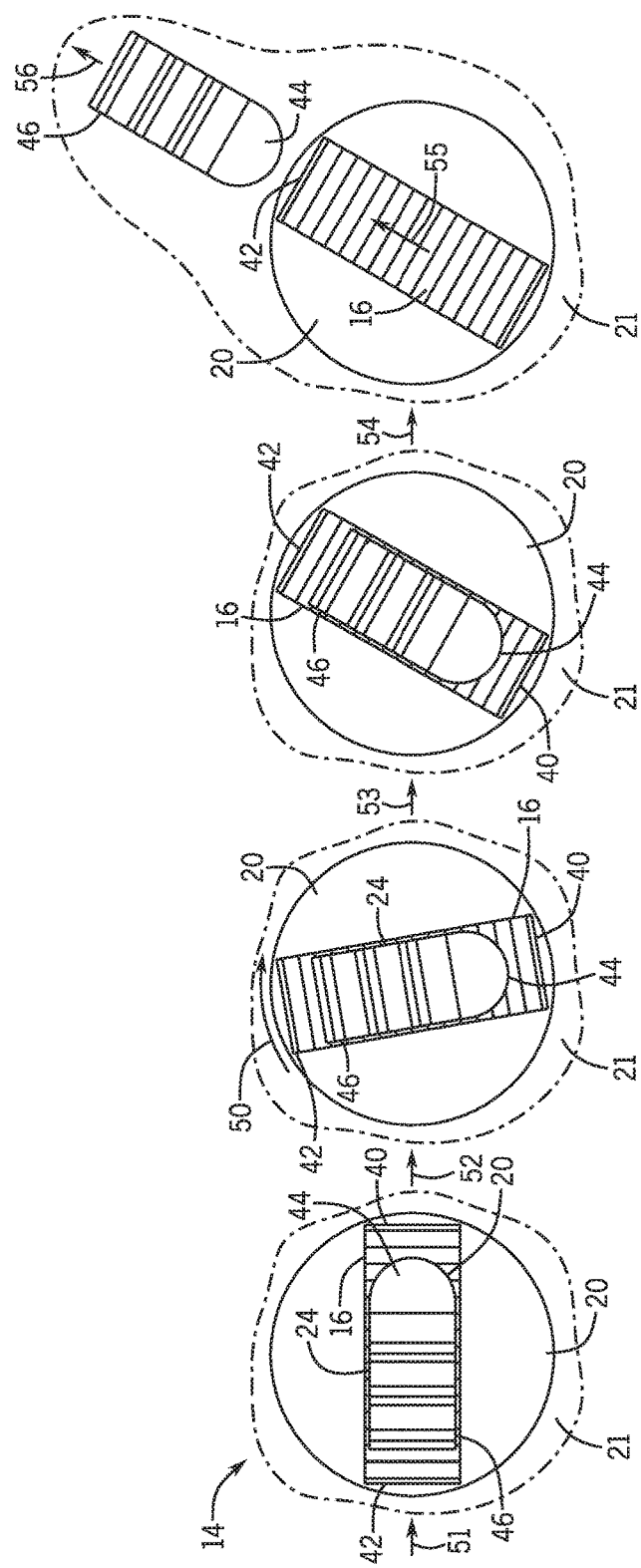
FIG. 4 is a schematic view of configurations of a variable vehicle ride switch in accordance with present techniques.

The actuation of the base and the conveyor 16 within and/or relative to the base 20 generates variability in potential exit positions for the ride vehicle 24. For example, the ride vehicle may complete a partial circuit or pathway in the forward orientation and then traverse the same pathway in the reverse orientation, permitting riders to see additional ride effects that may not be visible in the forward orientation, which may enhance a ride narrative. FIG. 4 is a schematic diagram of an orientation reversal technique for the ride vehicle 24 via the variable vehicle ride switch 14. The ride vehicle 24 enters the variable vehicle ride switch 14 in an entry orientation shown by arrow 51 and with the variable vehicle ride switch 14 in an entry position 52. In one embodiment, the entry position 52 may correspond with the conveyor 16 being generally aligned with the ride vehicle 24 such that movement onto the variable vehicle ride switch 14 is along the forward/backward axis (e.g., along arrows 48, FIG. 2) of linear movement of the conveyor 16. Entry to the variable vehicle ride switch 14 may be under current or gravity control. For example, the ride vehicle 24 may be implemented without motor power. In other embodiments, the ride vehicle 24 is powered by an on-board motor. The ride vehicle 24 enters the variable vehicle ride switch 14 and moves into position on the conveyor with the vehicle front 44 positioned towards the front edge of the conveyor 16.

When the ride vehicle 24 is in position on the conveyor 16, the base 20 rotates, shown by arrow 50 relative to the ride floor surface 21 to assume an intermediate position 53 in which the base 20, the conveyor 16, and the ride vehicle 24 are all rotated together and away from the entry position 52. While the depicted embodiment shows an approximately 90 degree rotation, it should be understood that the degree of rotation may be established according to desired ride goals. To achieve an exit position 54, the conveyor 16 is rotated relative to the base 20 to facilitate the variable vehicle ride switch 14 assuming the exit position 54. In certain embodiments, actuation to achieve the intermediate position 53 and the exit position 54 may occur in parallel or in series. If the actuation is in series, the base 20 may be fixed in position while the conveyor 16 rotates to assume the exit position 54, e.g., changes an angle of the conveyor 16 relative to the base 20. For example, the conveyor 16 may be oriented at an initial angle, e.g., relative to an imaginary line through a fixed pivot point of the conveyor 16 on the base 20, and may actuate to change the relative angle of the conveyor 16 to the imaginary line. The change may be a 5-90 degree change in one embodiment. The conveyor 16 actuates in a linear direction (e.g., shown by arrow 55) to move the ride vehicle 24 off the variable vehicle ride switch 14 such that the ride vehicle 24 moves along the desired pathway and such that the ride vehicle 24 is reversed relative to the entry orientation 51 and the vehicle back 46 is front-facing along the direction of motion, shown by arrow 56. It should be understood that the movements of the base 20 and the conveyor 16 may occur in parallel or in series. The reversal of orientation or change in orientation may occur while the vehicle 24 is positioned on the variable vehicle ride switch 14 between the steps of receiving the vehicle 24 and ejecting the vehicle 24. In one embodiment, the reversal of orientation may permit the vehicle 24 to be ejected back into the receiving pathway, but in the reverse orientation.

Figure 5:
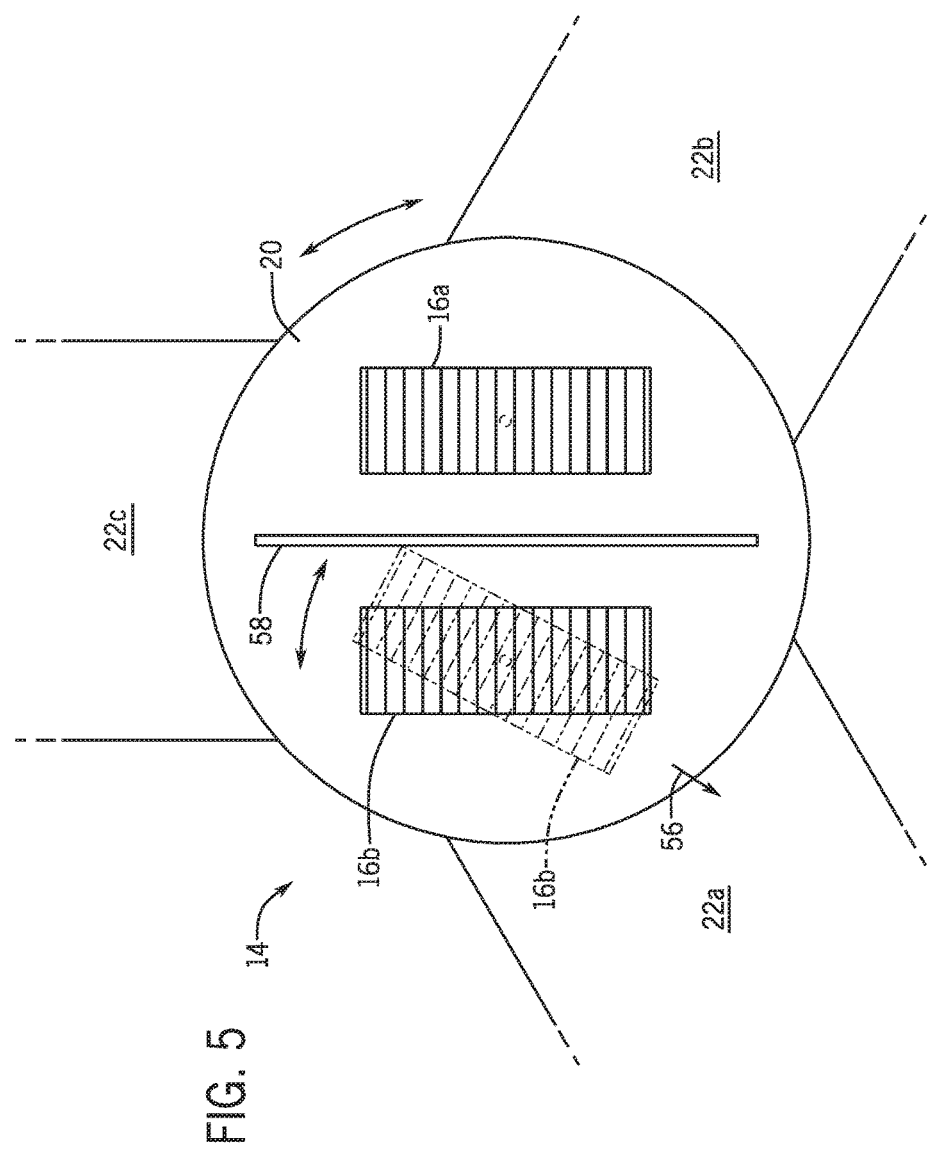
FIG. 5 is a top view of an embodiment of a variable vehicle ride switch in accordance with present techniques.

While certain embodiments are shown in the context of variable vehicle ride switches 14 that accommodate a single ride vehicle 24 at one time, it should be understood that the variable vehicle ride switch 14 may accommodate two or more ride vehicles 24 simultaneously. FIG. 5 is an embodiment of the variable vehicle ride switch 14 including multiple conveyors 16a, 16b. By permitting multiple ride vehicles 24 to be reoriented simultaneously, bottlenecks in the ride may be avoided. While in certain embodiments it may be enjoyable for passengers in one ride vehicle 24 to see the passengers in an adjacent ride vehicle 24 on the variable vehicle ride switch 14, in other embodiments the variable vehicle ride switch 14 may include a barrier 58 positioned at least at passenger eye level that blocks the view and maintains a more immersive experience. The barrier 58 may be implemented as a ride-themed object (e.g., a decorative object).

In the depicted embodiment, the conveyor 16b may actuate, for example about a midpoint, to align the conveyor 16b (and any ride vehicle 24 positioned on the conveyor 16b) with the desired pathway 22a. The conveyor 16b may actuate to align with the pathway 22a at a first time point while the conveyor 16a actuates to align with pathway 22b or 22c at a subsequent time point such that the ride vehicles 24 are released in series. In another embodiment, the conveyors 16a, 16b are configured to release their associated ride vehicles 24 simultaneously. Depending on the configuration of the pathways 22, the variable vehicle ride switch 14 may receive the vehicles at the same time or at different time points (e.g., receive a first ride vehicle 24 before receiving a second ride vehicle 24, actuate to realign the ride vehicles 24 with different pathways 22, and then release the ride vehicles 24 simultaneously and in opposite directions and/or orientations.

Figure 6:
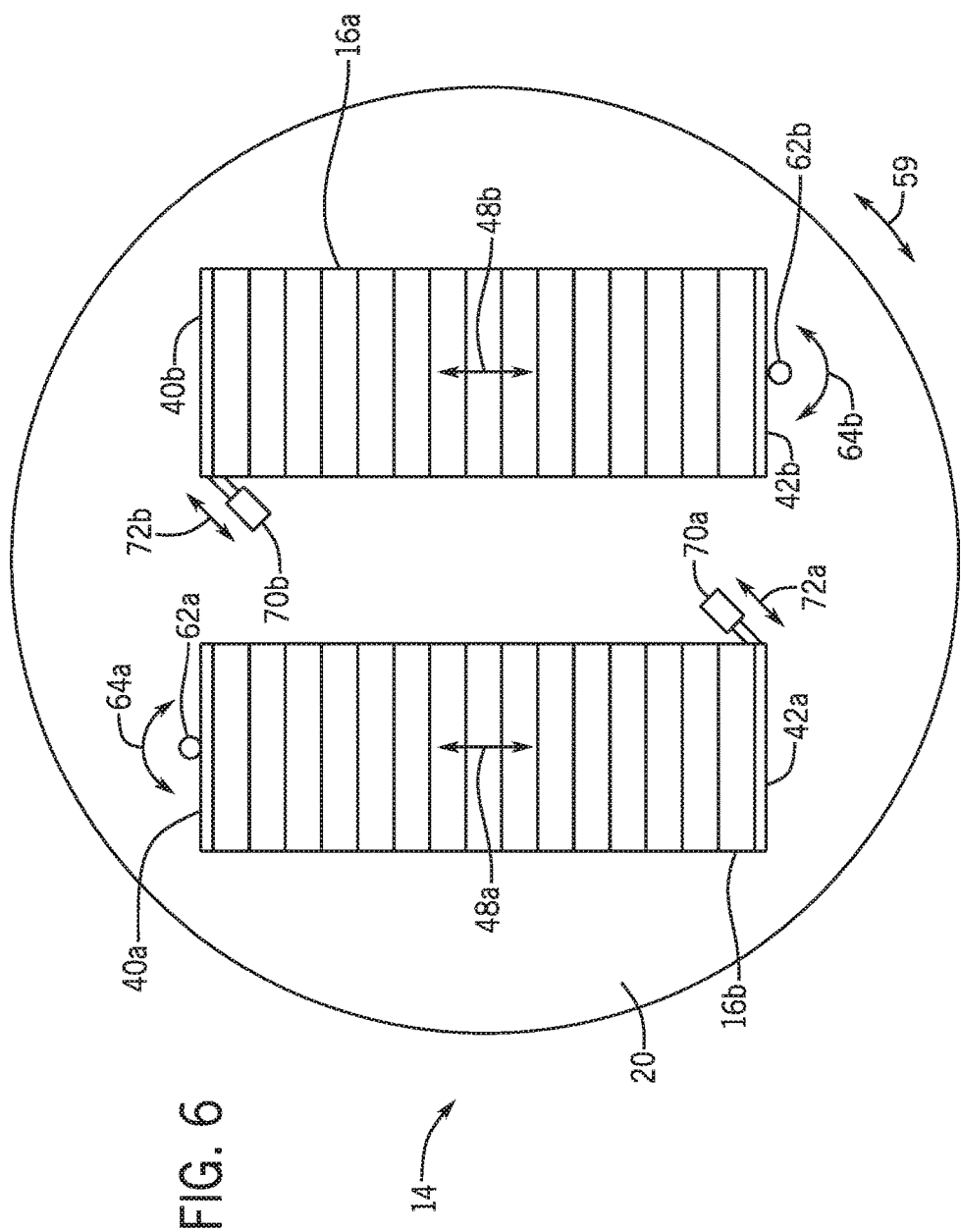
FIG. 6 is a top view of an embodiment of a variable vehicle ride switch in accordance with present techniques.
Figure 7:
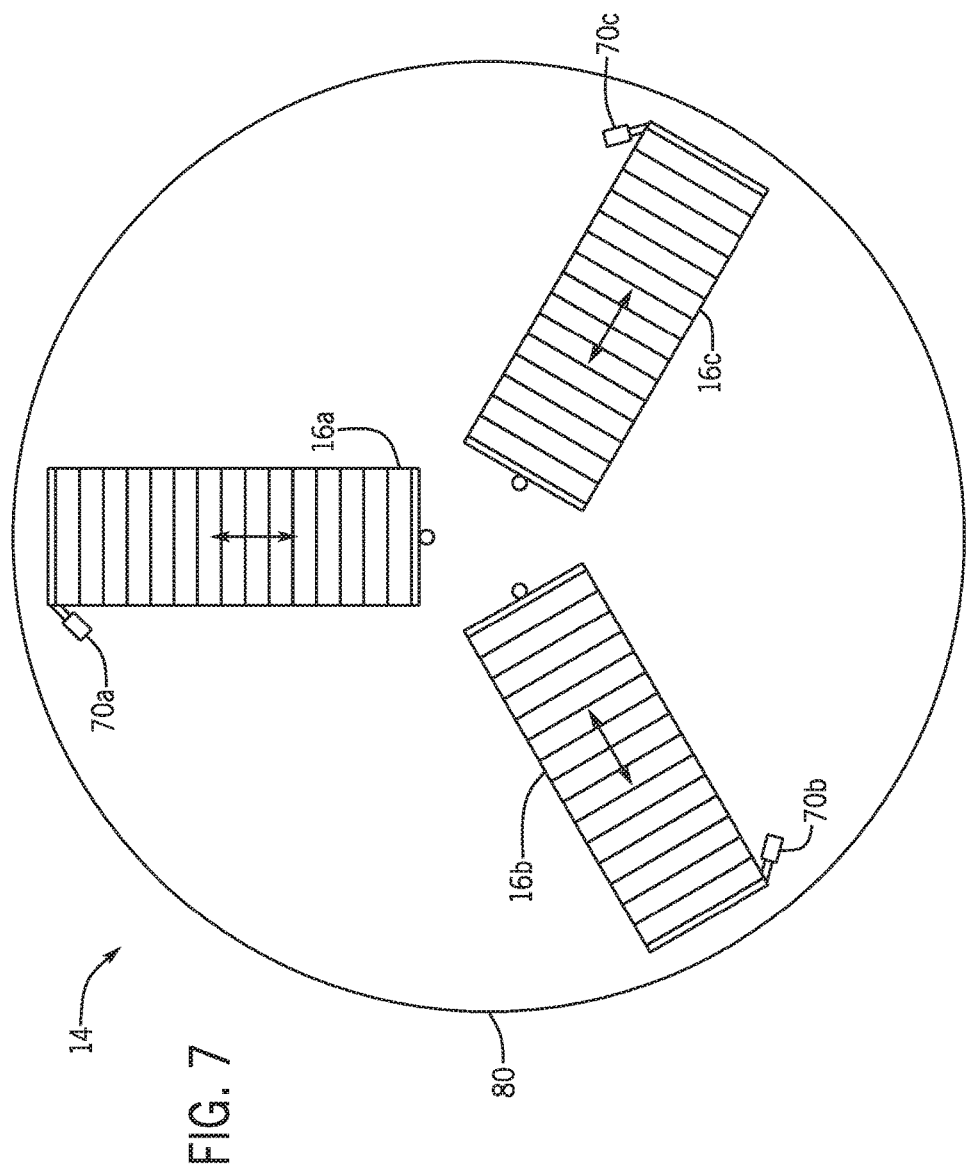
FIG. 7 is a schematic representation view of configurations of a variable vehicle ride switch in accordance with present techniques.

FIG. 6 is an example of a multiple vehicle variable vehicle ride switch 14 showing an embodiment in which actuation of the conveyor 16a, 16b is mediated by an actuation assembly that includes an actuator arm 70a, 70b positioned at an edge (e.g., the back edge 42a or the front edge 40a) of the conveyor 16a, 16b. Upon actuation via the actuator arm 70a, 70b, the conveyor 16a, 16b pivots about a pivot point 62a, 62b fixed at an opposing edge (shown by arrows 64a, 64b). Also illustrated are additional potential motions of the variable vehicle ride switch 14 along arrows 48a, 48b and rotation of the base 20 along arrows 59. In the depicted embodiment, the respective actuator arms 70a, 70b are positioned at opposing edges of the conveyors 16a, 16b, which are arranged side-by-side on the base 20. However, other arrangements are contemplated. For example, FIG. 7 illustrates a tri-conveyor 16 arrangement in which the actuators 70a, 70b, 70c are located closer to a perimeter 80 of the base 20.

Figure 8:
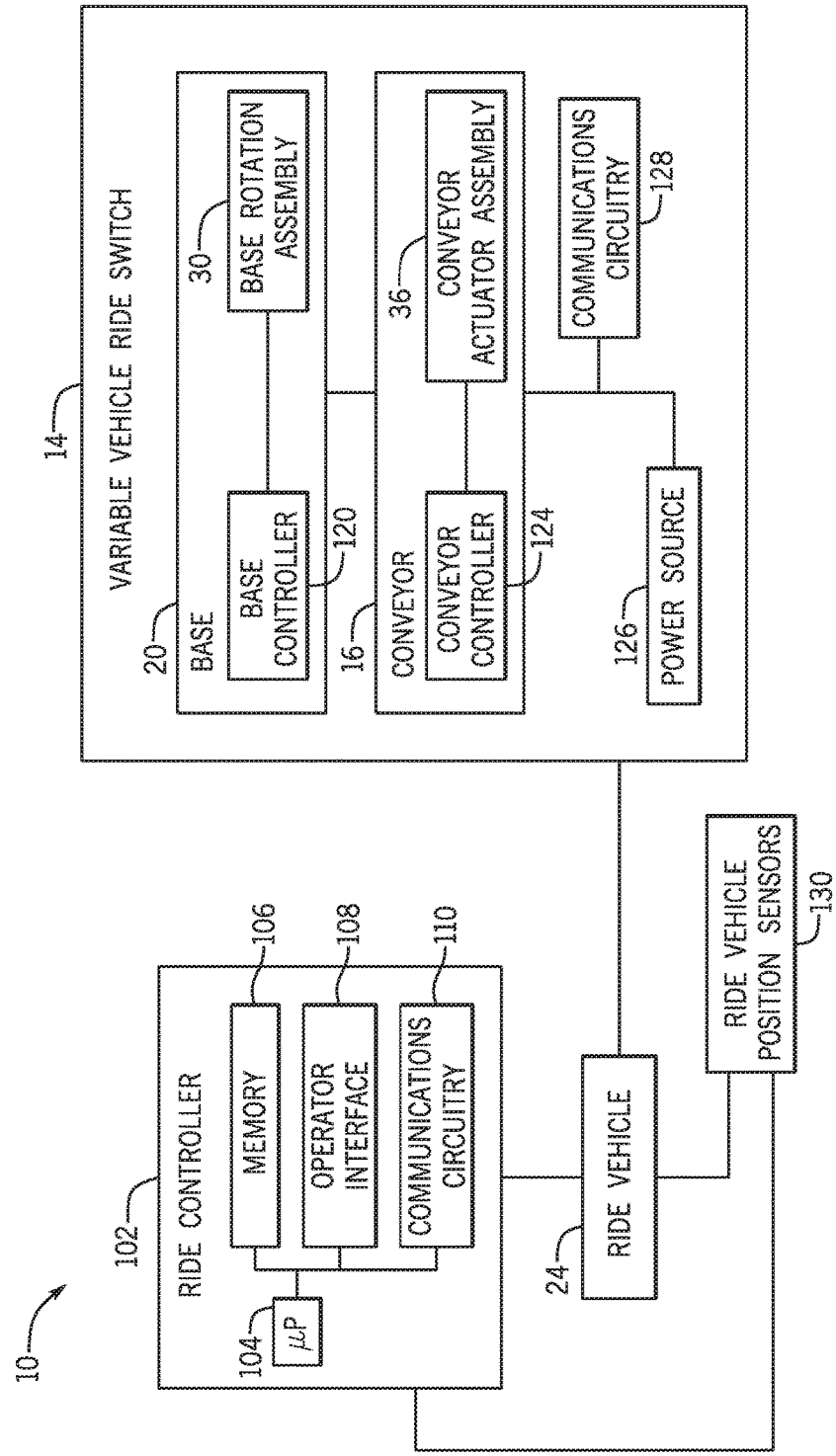
FIG. 8 is a block diagram of a ride system including a variable vehicle ride switch in accordance with present techniques.

FIG. 8 is a block diagram of the system 10, and the techniques disclosed herein may be used in conjunction with one or more components of the system 10, including the variable vehicle ride switch 14, the ride vehicle 24, a ride controller 102, and, in certain embodiments, feedback sensors such as ride vehicle position sensors 130. The ride controller 102 may include various components that may allow for interaction with the vehicle 24 and the variable vehicle ride switch 14. While these elements are discussed in the context of the ride controller 102, it should be understood that the variable vehicle ride switch 14 may include similar components. For example, the ride controller 102 may include a processor 104, a memory 106 for storing instructions executable by the processor 104 to perform the methods and control actions described herein for the ride system 10. The processor 104 may include one or more processing devices, and the memory 106 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 104 or by any general purpose or special purpose computer or other machine with a processor. In addition, the ride controller 102 may be configured to receive inputs via an operator interface 108 and communicate over wired or wireless communication pathways via communication circuitry 110 with the ride vehicle 24 and/or the variable vehicle ride switch 14.

Further, the variable vehicle ride switch 14 includes or is coupled to one or more controllers, such as a base controller 120 that controls a rotation assembly 30 that, for example, includes a base motor. The base controller 120, in turn, may be communicatively coupled to the ride controller 102, which provides outputs or activation signals that cause the base controller 120 to drive the rotation assembly 30. The variable vehicle ride switch 14 may also include a conveyor controller 124 that that drives an actuator assembly 36. The conveyor controller 124 may be communicatively coupled to the ride controller 102, which provides outputs or activation signals that cause the conveyor controller 124 to drive the actuator assembly 36. The variable vehicle ride switch 14 may include a power source 126 and communications circuitry 128 to facilitate communication with the ride controller 102.

The ride vehicle 24 may be coupled to a position tracking system for monitoring position in the ride system 10. In one embodiment, the position tracking system includes one or more ride vehicle position sensors 130, which may be coupled to the ride vehicle 24 or may be distributed throughout the ride system 10. The ride system 10 may determine ride vehicle position via the position tracking system that interacts with ride vehicle position sensors 130 or other suitable techniques for determining vehicle position. For example, the system 10 may include an external sensor, such as a camera, that tracks the positions of the ride vehicles 24 and provides data to the ride controller 102. In addition, the ride vehicle 24 may include transmitters, such as RFID transmitters, that provide signals to the ride controller 102 and that may be used to determine position information. In another embodiment, the vehicle position sensors 130 may be weight or pressure sensors positioned within the ride system, e.g. on the variable vehicle ride switch 14, to provide a signal that a ride vehicle 24 is in position on the conveyor 16. In another embodiment, the vehicle position sensors 130 may be optical sensors that track when the ride vehicle 24 passes certain positions within the ride system.

In one embodiment, data is transferred between the ride controller 102, the vehicle positions sensors 130, and the variable vehicle ride switch 14 at least in part via a wireless network. The ride system 10 may communicate data indicative of the status and/or position of the ride vehicle to the ride controller 102. Such data may include a vehicle identifier for an individual ride vehicle 24 and associated position, velocity, traveling direction, or the like. Based on the data, the ride controller 102 may send instructions to the variable vehicle ride switch 14 to dictate the pathway (e.g., pathway 22, see FIG. 1) of the ride vehicle 24. In accordance with the present disclosure, the ride controller 102 may control each of a plurality of variable vehicle ride switches 14 in the ride system 10 independently.

Figure 9:
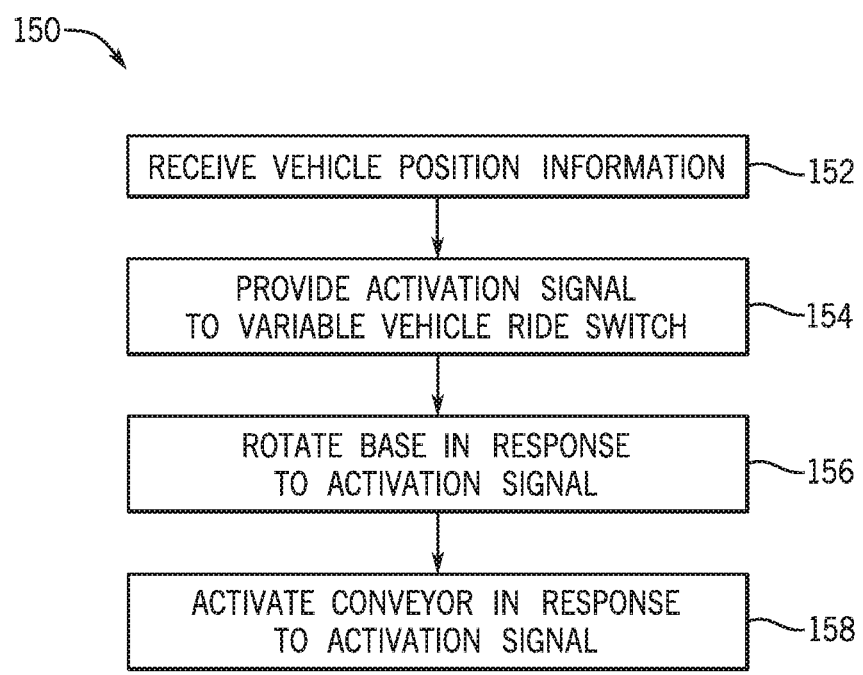
FIG. 9 is a flow diagram of a method for controlling a variable vehicle ride switch in accordance with present techniques.

FIG. 9 is a flow diagram of a method 150 that includes a step of receiving vehicle position information (block 152), e.g., via one or more ride vehicle position sensors 130, for one or more ride vehicles 24. In one embodiment, the position information is a position relative to the variable vehicle ride switch 14. Alternatively or additionally, the position of an individual ride vehicle 24 relative to the variable vehicle ride switch 14 may be estimated based on historical travel times between ride locations. When the position information provides information that the ride vehicle is on or near the variable vehicle ride switch 14, the ride controller 102 provides an activation signal to the variable vehicle ride switch 14 (block 154). In certain embodiments, the activation signal may be provided in advance of the arrival of the ride vehicle 24 to align the variable vehicle ride switch 14 with the incoming ride vehicle 24. When the ride vehicle is in position, the activation signal causes rotation of the base (block 156) and actuation of the conveyor 16 (block 158), which may occur in series or in parallel. The degree of rotation of the base 20 and actuation of the conveyor is established by the ride controller 102 and may be an activation signal.

The ride system 10 may use position information from the ride vehicle position sensors 130 as feedback to the ride controller 102, which in turn may control the variable vehicle ride switch 14 to control pathway selection and vehicle spacing based on the position information. For example, if the ride system 10 is configured such that a particular vehicle 24 of a plurality of vehicles 24 in the ride is programmed to progress down a pathway that is determined to be backed up or have insufficient spacing between the ride vehicles 24 based on vehicle position information, the ride system 10 may dynamically adjust the rotation and/or actuation of the variable vehicle ride switch 14 to address vehicle spacing. In one embodiment, the ride controller 102 may provide a signal to the actuator assembly 36 to provide vehicle braking via a reversed direction of the conveyor 16 to hold the vehicle in place on the variable vehicle ride switch 14 until the vehicle spacing has adjusted to a desired minimum distance between adjacent ride vehicles 24. In another embodiment, the conveyor 16 may be sped up to decrease vehicle spacing. Further, the variable vehicle ride switch 14 may be actuated to a different selected pathway than an initial programming selection based on ride traffic. As provided herein, the activation signals may be dynamically adjusted during the course of the ride to permit real-time variability.

While only certain features of the invention have been illustrated and described herein, many modifications and changes will occur to those skilled in the art. It is, therefore, to be understood that the appended claims are intended to cover all such modifications and changes as fall within the true spirit of the invention. While certain disclosed embodiments have been disclosed in the context of amusement or theme parks, it should be understood that certain embodiments may also relate to other uses. Further, it should be understood that certain elements of the disclosed embodiments may be combined or exchanged with one another. While certain disclosed embodiments are generally described in the context of water rides, water slides, or rides that include a water component, it should be understood that the variable vehicle ride switches as provided herein may also be used in other contexts and with non-water based rides.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A vehicle ride, comprising:
a variable vehicle ride switch comprising:
  a base configured to rotate with respect to a ride surface;
  a base controller configured to receive an activation signal to cause the base to rotate; and
  at least one conveyor positioned on the base and configured to rotate together with the base and configured to actuate relative to the base to move a ride vehicle onto or off of the base;
a plurality of vehicle pathways, wherein the variable vehicle ride switch is positioned at a junction of the plurality of vehicle pathways; and
a ride controller programmed with instructions to provide the activation signal to the base controller to cause the base to rotate to at least partially align the at least one conveyor with a vehicle pathway of the plurality of vehicle pathways, wherein the activation signal causes the base to rotate to at least partially align the at least one conveyor with a first vehicle pathway of the plurality of vehicle pathways when a first ride vehicle is on the at least one conveyor and to cause the base to rotate to at least partially align the at least one conveyor with a second vehicle pathway of the plurality of vehicle pathways when a second ride vehicle is on the at least one conveyor subsequent to the first ride vehicle, and wherein the first vehicle pathway is different from the second vehicle pathway.

2. The vehicle ride of claim 1, wherein the at least one conveyor comprises a first end and a second end and wherein the activation signal causes the base to rotate to at least partially align the first end or the second end with at least one vehicle pathway of the plurality of vehicle pathways.

3. The vehicle ride of claim 2, wherein the activation signal causes the base to rotate to at least partially align the first end with the first vehicle pathway of the plurality of vehicle pathways such that the ride vehicle on the at least one conveyor exits the variable vehicle ride switch in a reversed direction relative to entry onto the variable vehicle ride switch.

4. The vehicle ride of claim 3, wherein the activation signal causes the base to rotate to at least partially align the second end with the first vehicle pathway such that another ride vehicle on the at least one conveyor exits the variable vehicle ride switch in a same direction relative to entry onto the variable vehicle ride switch.

5. The vehicle ride of claim 1, wherein the at least one conveyor comprises at least a first conveyor and a second conveyor, and wherein the second conveyor is configured to actuate to move another ride vehicle onto or off of the base such that the variable vehicle ride switch is configured to accommodate a plurality of vehicles simultaneously.

6. The vehicle ride of claim 5, wherein the variable vehicle ride switch comprises a barrier between the first conveyor and the second conveyor.

7. The vehicle ride of claim 5, wherein the activation signal causes the base to rotate to at least partially align the first conveyor with the first vehicle pathway of the plurality of vehicle pathways and the second conveyor with the second vehicle pathway of the plurality of vehicle pathways.

8. The vehicle ride of claim 1, wherein the vehicle ride is a water ride and the variable vehicle ride switch is submerged in water.

9. The vehicle ride of claim 1, wherein the at least one conveyor is configured to actuate relative to the base in response to the activation signal such that the ride vehicle exits the variable vehicle ride switch at a speed that is slower than a vehicle speed at entry.

10. The vehicle ride of claim 1, wherein the at least one conveyor is configured to actuate relative to the base in response to the activation signal such that the ride vehicle exits the variable vehicle ride switch at a speed that is faster or equal to a vehicle speed at entry.

11. The vehicle ride of claim 1, wherein the base is configured to move with at least one additional degree of freedom relative to the ride surface.

12. The vehicle ride of claim 11, wherein the base is configured to tilt or rise relative to the ride surface.

13. The vehicle ride of claim 1, wherein the at least one conveyor is configured to actuate relative to the base in response to the activation signal to fully align a partial alignment with the vehicle pathway of the plurality of vehicle pathways.

14. The vehicle ride of claim 13, wherein the at least one conveyor is configured to rotate within the base in response to the activation signal.

15. The vehicle ride of claim 1, wherein the at least one conveyor is configured to have at least two degrees of movement relative to the base.

16. A method, comprising:
receiving a first ride vehicle on a variable vehicle ride switch;
receiving a second ride vehicle on the variable vehicle ride switch;
rotating a base of the variable vehicle ride switch to a first exit position while the first ride vehicle is on the variable vehicle ride switch;
conveying the first ride vehicle off of the variable vehicle ride switch at the first exit position of the base;
rotating the base of the variable vehicle ride switch to a second exit position of the base while the second ride vehicle is on the variable vehicle ride switch; and
conveying the second ride vehicle off of the variable vehicle ride switch at the second exit position, wherein the second exit position is different from the first exit position.

17. The method of claim 16, wherein the first ride vehicle is received by the variable vehicle ride switch at a first starting position of the base and rotating the base to the first exit position comprises a rotation of 270 degrees or less from the first starting position.

18. The method of claim 17, wherein the second ride vehicle is received by the variable vehicle ride switch at the first exit position of the base and rotating the base to the second exit position comprises a second rotation of 270 degrees or less from the first exit position.

19. The method of claim 17, comprising receiving a third ride vehicle on the variable vehicle ride switch when the variable vehicle ride switch is at the first starting position of the base and such that the first ride vehicle and the second ride vehicle are on the base simultaneously.

20. The method of claim 19, wherein the first ride vehicle and the second ride vehicle are both conveyed from the base at the first exit position.

21. The method of claim 20, wherein the first ride vehicle and the second ride vehicle are both conveyed from the base at the first exit position in opposite directions and onto different vehicle pathways.

22. The method of claim 16, wherein the first ride vehicle and the second ride vehicle are on the base simultaneously.

23. The method of claim 16, wherein the second ride vehicle is received by the variable vehicle ride switch subsequent to receiving the first ride vehicle.

24. The method of claim 16, wherein rotating the base to the first exit position comprises aligning the first ride vehicle with a first vehicle pathway.

25. The method of claim 24, wherein the aligning comprises reversing an orientation of the first ride vehicle.

26. The method of claim 16, wherein conveying the first ride vehicle off of the variable vehicle ride switch at the first exit position of the base comprises actuating a conveyor from a first angle to a second angle within the base.

27. The method of claim 16, wherein conveying the second ride vehicle off of the variable vehicle ride switch at the second exit position of the base comprises rotating a conveyor within the base.

28. The method of claim 16, comprising receiving an activation signal and rotating the base to the first exit position and the second exit position based on the activation signal.

29. A variable vehicle ride switch comprising:
a base configured to rotate with respect to a ride surface;
at least one conveyor positioned on the base and configured to actuate relative to the base to move a ride vehicle towards or away from an outer edge of the base and to change an angle or orientation of the at least one conveyor within the base; and
a controller configured to receive an activation signal to cause the base to rotate and to cause the at least one conveyor to actuate.

30. The variable vehicle ride switch of claim 29, wherein the at least one conveyor is configured to rotate relative to the base when the base is in a fixed position.

31. The variable vehicle ride switch of claim 29, wherein the at least one conveyor comprises a belt.

32. The variable vehicle ride switch of claim 29, wherein the at least one conveyor comprises a first conveyor and a second conveyor.

* * * * *